US012808763B2

(12) United States Patent
Schöllhammer et al.

(10) Patent No.: US 12,808,763 B2
(45) Date of Patent: Nov. 24, 2026

(54) METHOD AND DEVICE FOR DETERMINING THE LONGITUDINAL FORCES IN TRACK RAILS

(71) Applicant: Plasser & Theurer Export von Bahnbaumaschinen Gesellschaft m.b.H., Vienna (AT)

(72) Inventors: Daniel Schöllhammer, Linz (AT); Harald Daxberger, Linz (AT); Markus Quittner, Linz (AT); Christian Koczwara, Gresten (AT); Florian Auer, Vienna (AT)

(73) Assignee: Plasser & Theurer, Export von Bahnbaumaschinen, Gesellschaft m.b.H., Vienna (AT)

( * ) Notice: Subject to any disclaimer, the term of this patent is extended or adjusted under 35 U.S.C. 154(b) by 230 days.

(21) Appl. No.: 18/703,448

(22) PCT Filed: Oct. 18, 2022

(86) PCT No.: PCT/EP2022/078944
§ 371 (c)(1),
(2) Date: Apr. 22, 2024

(87) PCT Pub. No.: WO2023/066918
PCT Pub. Date: Apr. 27, 2023

(65) Prior Publication Data

US 2025/0224317 A1 Jul. 10, 2025

(30) Foreign Application Priority Data

Oct. 21, 2021 (AU) ............................. A 50837/2021

(51) Int. Cl.
*E01B 27/20* (2006.01)
*B61L 23/04* (2006.01)
(Continued)

(52) U.S. Cl.
CPC .............. *G01N 3/10* (2013.01); *B61L 23/047* (2013.01); *E01B 27/17* (2013.01); *E01B 27/20* (2013.01);
(Continued)

(58) Field of Classification Search
CPC .......... G01N 3/10; G01N 3/06; B61L 23/047; E01B 27/17; E01B 27/20; E01B 33/00;
(Continued)

(56) References Cited

U.S. PATENT DOCUMENTS 3,828,440 A 8/1974 Plasser et al.
3,943,857 A 3/1976 Theurer
(Continued)

FOREIGN PATENT DOCUMENTS

AT 305334 B 2/1973
CN 2550407 Y 5/2003
(Continued)

OTHER PUBLICATIONS

CN-101660958-A, English Translation (Year: 2010).*
(Continued)

*Primary Examiner* — Ryan D Walsh
(74) *Attorney, Agent, or Firm* — Laurence A. Greenberg; Werner H. Stemer; Ralph E. Locher

(57) ABSTRACT

A method for determining the longitudinal forces in track rails includes shifting a rail section of at least one of the track rails from an initial arrangement into a test arrangement by providing a test force, recording at least one force measurement value correlating with the test force in the test arrangement, and determining the longitudinal forces in the at least one track rail on the basis of the at least one force measurement value. At least one sleeper is attached to the rail section when the at least one force measurement value is recorded. A device for carrying out the method is also provided.

15 Claims, 4 Drawing Sheets

(51) Int. Cl.

| | |
|---|---|
| ***E01B 27/17*** | (2006.01) |
| ***E01B 33/00*** | (2006.01) |
| ***E01B 35/00*** | (2006.01) |
| ***G01M 5/00*** | (2006.01) |
| ***G01N 3/06*** | (2006.01) |
| ***G01N 3/10*** | (2006.01) |

(52) U.S. Cl.
CPC .............. *E01B 33/00* (2013.01); *E01B 35/00* (2013.01); *G01M 5/0025* (2013.01); *G01M 5/0058* (2013.01); *G01N 3/06* (2013.01); *E01B 2203/10* (2013.01); *E01B 2203/12* (2013.01); *E01B 2203/16* (2013.01)

(58) Field of Classification Search
CPC .. E01B 35/00; E01B 2203/10; E01B 2203/12; E01B 2203/16; G01M 5/0025; G01M 5/0058
See application file for complete search history.

(56) References Cited

U.S. PATENT DOCUMENTS

| | | | | |
|---|---|---|---|---|
| 2012/0300060 | A1 * | 11/2012 | Farritor .................... | B61K 9/08 348/125 |
| 2015/0368865 | A1 | 12/2015 | Lichtberger | |

FOREIGN PATENT DOCUMENTS

| | | | | |
|---|---|---|---|---|
| CN | 101660958 | A | * | 3/2010 |
| DE | 2418318 | C2 | | 12/1982 |
| WO | 2008129105 | A1 | | 10/2008 |

OTHER PUBLICATIONS

Sato Y, "Study on measurement of rail longitudinal force on slab track by rail lifting", Ashurst Lodge, Southampton, SO40 7AA, UK, DOI: 10.2495/CR020561, ISBN: 9781853129131, Jan. 1, 2002 ( Jan. 1, 2002), Called from: URL:https://www.witpress.com/Secure/elibrary/papers/CR02/CR02056FU.pdf, XP093020029, DOI: 10.2495/CR020561, ISBN: 9781853129131, [found on Feb. 1, 2023], Summary, pp. 1-9.

Endo et al., An Improvement of rail axial force measurement by lifting method , Dec. 5-7, 2018, The Proceedings of the 25th Joint Symposium on Railway Technology (J-RAIL2018), No. 18-83, Japan Society of Mechanical Engineers, Tokyo, Japan.

* cited by examiner

METHOD AND DEVICE FOR DETERMINING THE LONGITUDINAL FORCES IN TRACK RAILS

FIELD AND BACKGROUND OF THE INVENTION

The invention relates to a method for determining the longitudinal forces in track rails. The invention further relates to a device for carrying out such a method.

A method for determining the longitudinal forces in track rails, in which track rails that are completely detached from sleepers are lifted vertically, is known from previous use. The test force required for this is recorded. The test force is used to determine the longitudinal forces present in the track rails. The disadvantage is that detaching the track rails from the sleepers is time consuming and cost intensive. The track is not available for rail traffic during this period. To avoid distortions of the track rails when detaching them from the sleepers, the method can only be carried out if the temperature of the track rails is below the neutral temperature.

SUMMARY OF THE INVENTION

It is an object of the invention to create an improved method for determining the longitudinal forces in track rails which, in particular, can be carried out in a particularly flexible, time-efficient, and economical manner.

This object is achieved by way of a method with the features of the invention. It was recognized that determining the longitudinal forces in at least one track rail using at least one force measurement value correlating with a test force can be carried out in a particularly flexible, time-efficient, and economical manner if, when the at least one force measurement value is recorded, at least one of the sleepers is attached to the rail section which is shifted between an initial arrangement and a test arrangement by providing the test force. The fact that the at least one sleeper remains attached to the track rail means that there is no need to detach or connect it. Track possession times can be reduced or completely avoided. Distortions of the track rails, especially at rail temperatures above neutral temperature, for example due to unexpectedly high or rapidly rising ambient temperatures, can be reliably prevented thanks to the continued support of the track rails by the sleepers.

In the following, the longitudinal forces in track rails are understood to be the stresses prevailing in the track rails and the loads acting on the track rails, which act along the longitudinal direction of the track rails. Such loads are, for example, external forces and/or temperatures, in particular temperature changes. Corresponding stresses include tensions and strains.

The test force is understood to be the force that causes the rail section of the at least one track rail to be shifted into the test arrangement and/or the rail section to be held in the test arrangement. The test force can comprise at least one point load and/or at least one line load. Preferably, the test force is applied to the rail section in the form of a single point load. The at least one point load can, for example, be effected by means of an actuator, in particular a hydraulic actuator, and/or transferred to the respective rail section by means of a grapple.

The rail section is understood to be that section of the at least one track rail which is shifted in the test arrangement relative to the initial arrangement. The rail section overlaps along the longitudinal direction of the track at least at the location where the test force is provided on the at least one track rail. The rail section is preferably limited along the longitudinal direction by those sections of the at least one track rail that do not undergo any shifting in the test arrangement compared to the initial arrangement.

The track preferably comprises the sleepers and two track rails arranged parallel to each other and spaced apart according to a track gauge. According to one aspect of the invention, two parallel rail sections of the two track rails that completely overlap in the longitudinal direction of the track are shifted by providing the test force. In particular, a track section corresponding to the longitudinal extent of these rail sections can be shifted from the initial arrangement into the test arrangement by providing the test force.

The rail section of the at least one track rail is preferably shifted perpendicular to the longitudinal direction of the track, in particular in the horizontal direction and/or in the vertical direction, in particular exclusively in one of these directions. The force measurement value can have a horizontal component and/or a vertical component for this purpose. The at least one force measurement value can be recorded using at least one force measuring means, in particular at least one load cell.

Preferably, the at least one sleeper attached to the rail section is shifted by providing the test force, in particular together with the rail section from the initial arrangement into the test arrangement. Preferably, at least two, in particular at least three, in particular at least five of the sleepers are attached in the rail section of the at least one track rail.

According to a further aspect of the invention, the rail section, in particular the paired rail sections, and/or the track, is shifted from the initial arrangement into at least two, in particular at least three, in particular at least five, and/or a maximum of ten, of the test arrangements. In each of these test arrangements, a force measurement value correlating with the respective test force can be determined. This can be used to determine the longitudinal forces in the at least one track rail. In particular, a progression of the at least one force measurement value can be determined when shifting it into the at least one test arrangement. The longitudinal forces in the at least one track rail can be determined repeatedly based on the progression of the at least one force measurement value. An average value of the repeatedly determined longitudinal forces can be calculated. This allows the longitudinal forces to be determined particularly reliably and precisely.

According to a further aspect of the invention, the longitudinal forces can further be determined on the basis of the weight of the at least one track rail and/or the at least one sleeper attached to the rail section. The weight of the track rail, for example, can be assumed to be the line load. The weight of the at least one sleeper can also be included in the determination of the longitudinal forces as an approximate line load and/or in the form of individual point loads. This allows the longitudinal forces to be determined with particular precision.

According to one aspect of the invention, the shifting from the initial arrangement into the test arrangement and/or the recording of the at least one force measurement value takes place at a rail temperature which is above and/or below the neutral temperature. The neutral temperature is understood to be the rail temperature at which the longitudinal forces, in particular the longitudinal strains, in the respective track rail are equal to zero. Advantageously, this ensures that the method can also be carried out at elevated ambient temperatures and/or without knowledge of the neutral temperature. This is made possible in particular by the fact that the track rails do not have to be detached from the sleepers, which means that they remain fixed in position and distortions transverse to the longitudinal direction are avoided. The method is therefore very robust against high rail temperatures, for example due to inaccurate weather forecasts or assembly delays.

According to a further aspect of the invention, a temperature measurement value correlating with the temperature of the at least one track rail is recorded. Preferably, the temperature measurement value is recorded by contact and/or contactless means, particularly by means of a pyrometer. Recording the temperature measurement value may involve averaging multiple individual measurements. Preferably, the temperature measurement value is recorded in the area of the rail section and/or at the time when the at least one force measurement value is recorded. Preferably, the longitudinal forces and the associated temperature measurement value are matched in terms of location and time, in particular a combined documentation.

A method according to the invention is particularly time-efficient and economical to carry out. The track should preferably be fully assembled. The method can be carried out after the track has been constructed, in particular before it is opened for operation for the first time, and/or after it has already been used in operation, in particular in the course of a maintenance measure. The fastening of the track rails to all sleepers is preferably completely preserved, especially compared to the condition intended for operation. This means that track possession times can be reduced, in particular avoided. The required assembly effort is also reduced.

A method according to the invention can be used particularly flexibly. The neutral temperature is preferably determined using the at least one temperature measurement value and the determined longitudinal forces, in particular the longitudinal strain. According to known correlations, the thermal expansion coefficient of a track rail in the longitudinal direction can be used to determine the temperature difference required to achieve a certain longitudinal strain. The neutral temperature makes it possible to visualize and compare the stress on the track rails particularly clearly. In particular, a neutral temperature limit value can be specified. If the temperature falls below and/or exceeds the neutral temperature limit value, it is preferably determined that maintenance measures are necessary. As a result, normal running may be restricted or blocked.

A method according to the invention ensures determining the longitudinal forces in a particularly reliable and precise manner. The at least one distance measurement value can be determined at any position along the rail section, but preferably in the area, in particular at the location, of the test force acting on the rail section. The at least one distance measurement value can correlate with the vertical deflection and/or a horizontal deflection of the rail section between the initial arrangement and the test arrangement. As an alternative to recording the distance measurement value, the rail section can be shifted into a predetermined test position, for example by means of a shifting mechanism with a fixed end stop, in particular by means of a toggle lever.

A method according to the invention is particularly time efficient and economical to carry out. The lifting and lining unit is a device for shifting a track from an actual track arrangement to a target track arrangement. The lifting and lining unit is preferably designed to shift the track transversely to the longitudinal direction, in particular in the vertical direction and/or horizontal direction. In many cases, lifting and lining units are already available for track construction and maintenance. This means that there is no need to purchase additional equipment to shift the rail section. In particular, the method can be carried out in parallel with a method for lifting and/or shifting the track to the target track arrangement.

A method according to the invention is particularly time efficient and economical to carry out. The track bed on which the rail section is based is preferably compacted in a maintenance arrangement of a rail section that is at least partially achieved by shifting the initial arrangement into the test arrangement. The lifting of the track, which is conducive to a compaction method, can thus be used in parallel to determine the longitudinal forces. The at least one force measurement value is preferably recorded at a different time from the compaction process, in particular the penetration of the tamping tines into the ballast bed. This can prevent measurement errors, particularly due to interfering influences on the recording of the force measurement value.

A method according to the invention ensures determining the longitudinal forces in a particularly reliable and precise manner. By taking into account the influence of the track bed stiffness on the determination of the longitudinal forces, it is ensured that the longitudinal forces can be determined reliably and precisely, especially in case of varying properties of the track bed. The track bed stiffness can, for example, be incorporated into a bedding model based on the Winkler bedding modulus method.

A method according to the invention is particularly flexible to use and ensures that the longitudinal forces are determined in a particularly precise manner. Preferably, a bedding measurement value correlating with the bedding stiffness on which the rail section is based is recorded. The bedding measurement value can be used to determine the longitudinal forces. This allows the influence of various bedding stiffnesses on the determination of the longitudinal forces to be taken into account. The bedding measurement value can be determined, for example, in the form of a compaction measurement value, in particular using a measurement value recorded by the tamping unit, and/or using at least one force measurement value that correlates with the test force. The compaction measurement value correlates in particular with reaction forces between the track bed and the tamping tines of the tamping unit when compacting the track bed.

A method according to the invention ensures determining the longitudinal forces in a particularly reliable and precise manner. The computing capacity required to carry out the method is comparatively low. In particular, the longitudinal forces can be determined using the at least one force measurement value by means of an evaluation device with a conventional microcontroller and/or a conventional desktop PC. Suitable analytical methods include, for example, a structural model in which the at least one track rail, in particular together with the sleepers, is modelled as a beam, in particular as an elastically embedded beam. A corresponding analytical method can, for example, be based on Bernoulli's linear beam theory or a non-linear beam theory.

According to one, in particular independent, aspect of the invention, the longitudinal forces in track rails are determined taking into account the bedding stiffness of the track bed on which a corresponding rail section is based. In particular, the longitudinal forces can be determined on the basis of the properties of the sleeper, in particular the weight of the sleeper, which is connected in particular to the at least one track rail.

A method according to the invention ensures determining the longitudinal forces in a particularly reliable and robust manner. Determining the longitudinal forces in track rails on the basis of the at least one force measurement value, which correlates with a test force for shifting a rail section from an initial arrangement into a test arrangement, on the basis of the finite element method (FEM) represents in particular an independent aspect of the invention. The FEM can be used indirectly to determine the longitudinal forces. Alternatively, the FEM can be used to determine the parameters of analytical methods for determining the longitudinal forces. A corresponding method is also referred to as a semi-analytical method. Preferably, the FEM is based on modelling of the at least one track rail using Lagrange polynomials, even more preferably on modelling using non-uniform rational B-splines (NURBS). A particularly precise determination of the longitudinal forces in track rails is made possible by an isogeometric analysis of a structural model of the track and/or the track bed.

A method according to the invention ensures determining the longitudinal forces in a particularly robust and precise manner. The longitudinal forces are preferably determined using at least two, in particular at least three, in particular at least five, in particular at least ten of the force measurement values. The force measurement values are preferably recorded at the same position and/or at different positions along the longitudinal direction of the track. An average value can be formed over multiple of the force measurement values. Furthermore, the number of pre-known parameters required to calculate the longitudinal forces can be reduced. The method is particularly flexible to carry out and leads to particularly precise results.

A further object of the invention is to create an improved device for determining the longitudinal forces in track rails, in particular for carrying out the method described above, which is particularly flexible, time-efficient and economical to carry out.

This object is achieved by way of a device with the features of the invention. The advantages of the device correspond to the advantages of the method described above. Preferably, the device is further developed with at least one of the features described above in connection with the method. The test device preferably has at least one test actuator, in particular a lifting actuator and/or a lining actuator, for shifting the respective rail section of the at least one track rail, in particular of two track rails, in particular of a track section, from the initial arrangement into the test arrangement by providing the test force. The at least one test actuator can be designed to shift the rail section in a vertical direction and/or in a horizontal direction.

The test device may preferably have at least one force measuring means for recording the at least one force measurement value. The test device may have at least one distance measuring means for recording the at least one distance measurement value.

According to one aspect of the invention, the device is designed as a track construction and maintenance machine, in particular for the construction and/or maintenance of a track.

A device according to the invention is particularly flexible and time efficient to use. The running trailer can be designed as a road-rail vehicle. The running trailer can have a traction motor or be designed as a trailer without traction drive. The test device is preferably attached to the running trailer in a non-detachable or detachable manner. The test device can have a coupling for detachably connecting it to the running trailer.

A device according to the invention is particularly flexible and economical to use. The test device can preferably be used to determine the longitudinal forces in the rail section on which the running trailer is arranged, in particular the section on which the running trailer overlaps along the longitudinal direction of the track. The device can additionally or alternatively be used to determine the longitudinal forces in a rail section of an adjacent track. For this purpose, the device can have a positioning device connected to the running trailer for shifting the test device perpendicular to the track.

A device according to the invention is particularly flexible and economical in operation. Preferably, the at least one test actuator for shifting the rail section from the initial arrangement into the test arrangement is used both for determining the longitudinal forces, in particular for effecting the test force, and for compacting the track bed on which the rail section is based. A separate lifting actuator can be dispensed with. The compaction of the track bed and the determination of the longitudinal forces in the track rails can at least be carried out in parallel.

Further features, details, and advantages of the invention result from the following description of an embodiment based on the figures.

DETAILED DESCRIPTION OF THE INVENTION

Figure 1:
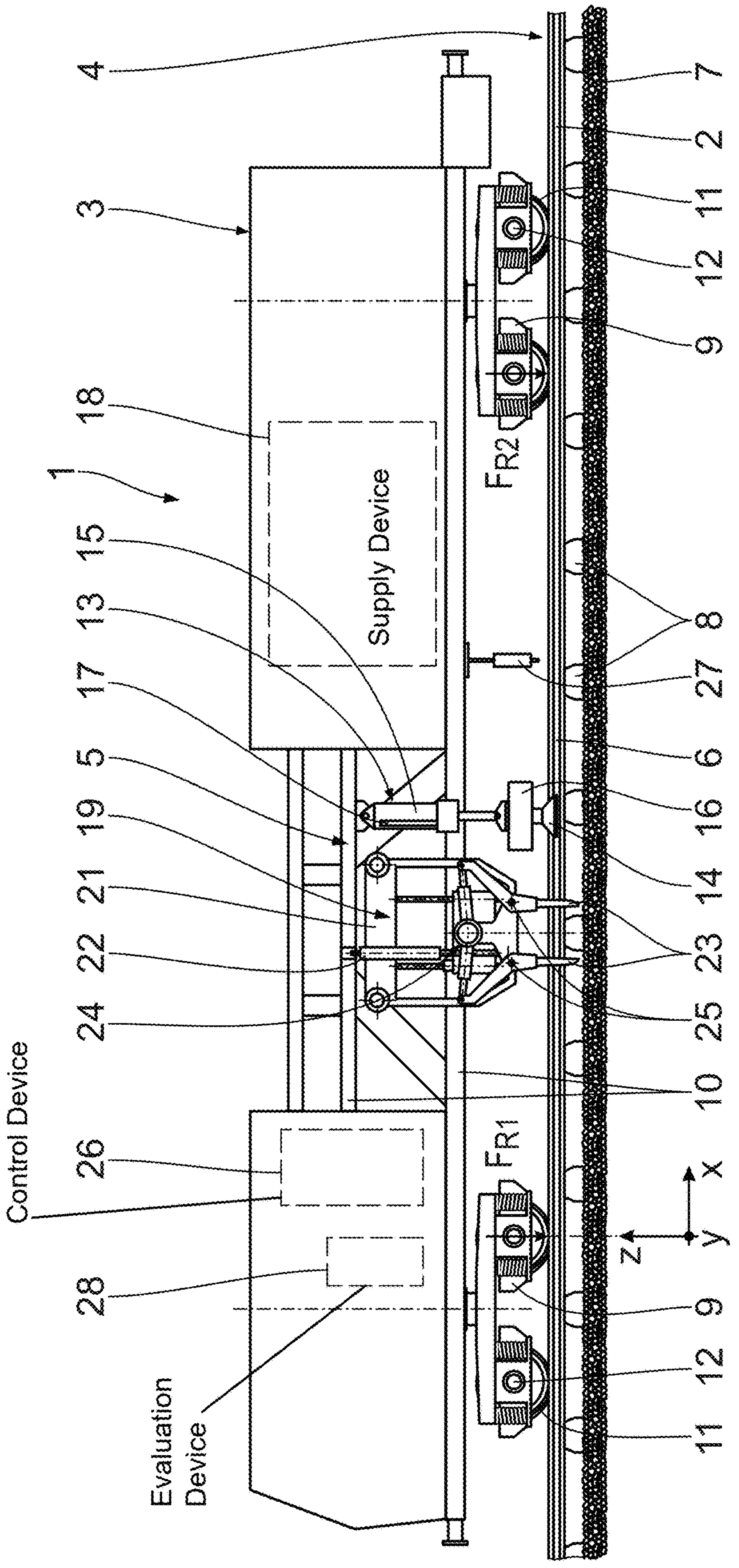
FIG. 1 a side view of a device, in particular a track construction and maintenance machine, for determining the longitudinal forces in rails, having a test device for shifting a rail section, with the rail section being arranged in an initial arrangement, FIG. 2 a side view of the device in FIG. 1, with a test force being exerted on the rail section by means of the test device and with the rail section being arranged in a test arrangement, FIG. 3 a structural model of the rail section in FIG. 2 for determining the longitudinal forces using the at least one force measurement value, and FIG. 4 a free body diagram of a section of the structural model in FIG. 3 with the cutting forces acting at the cut boundaries.
Figure 2:
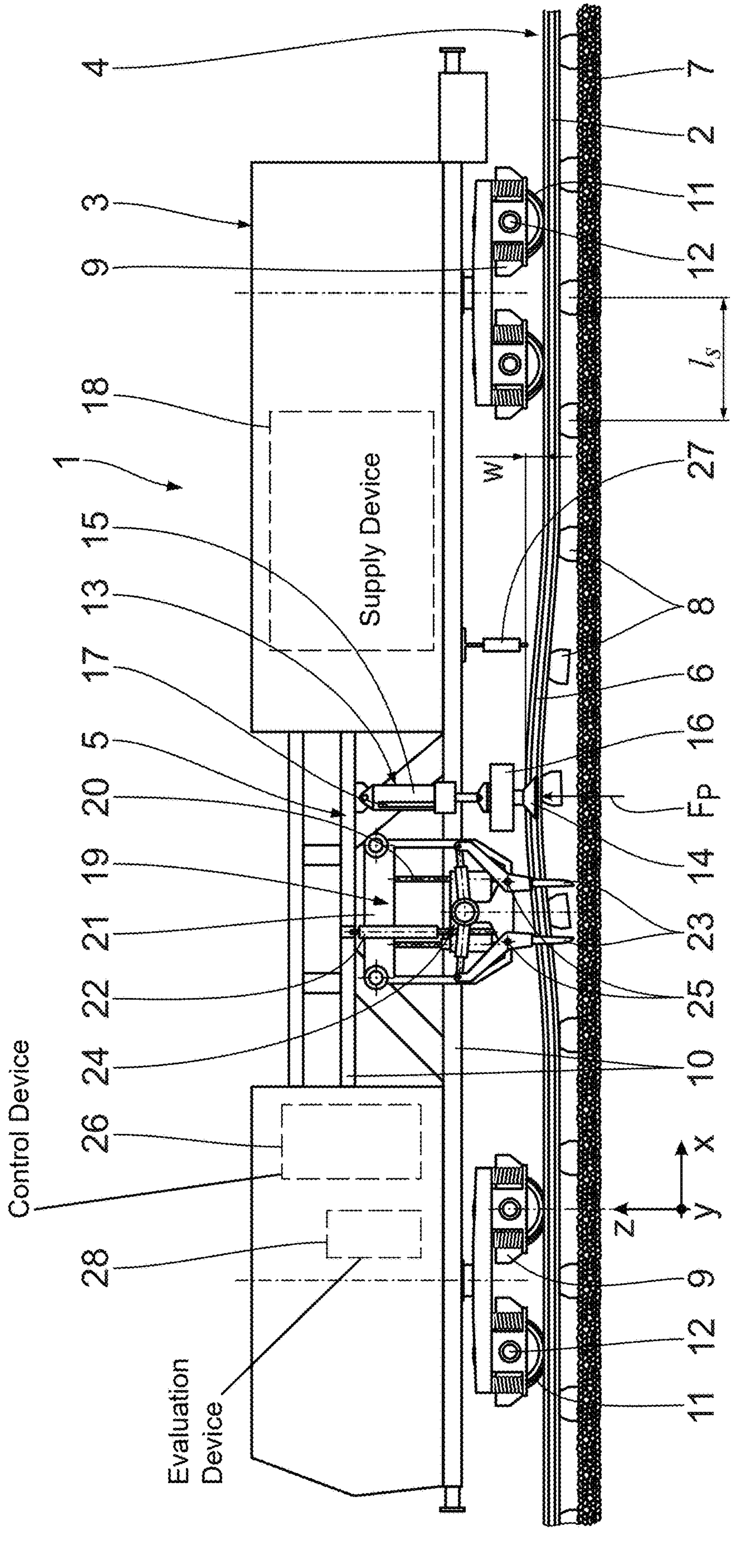
Figure 3:
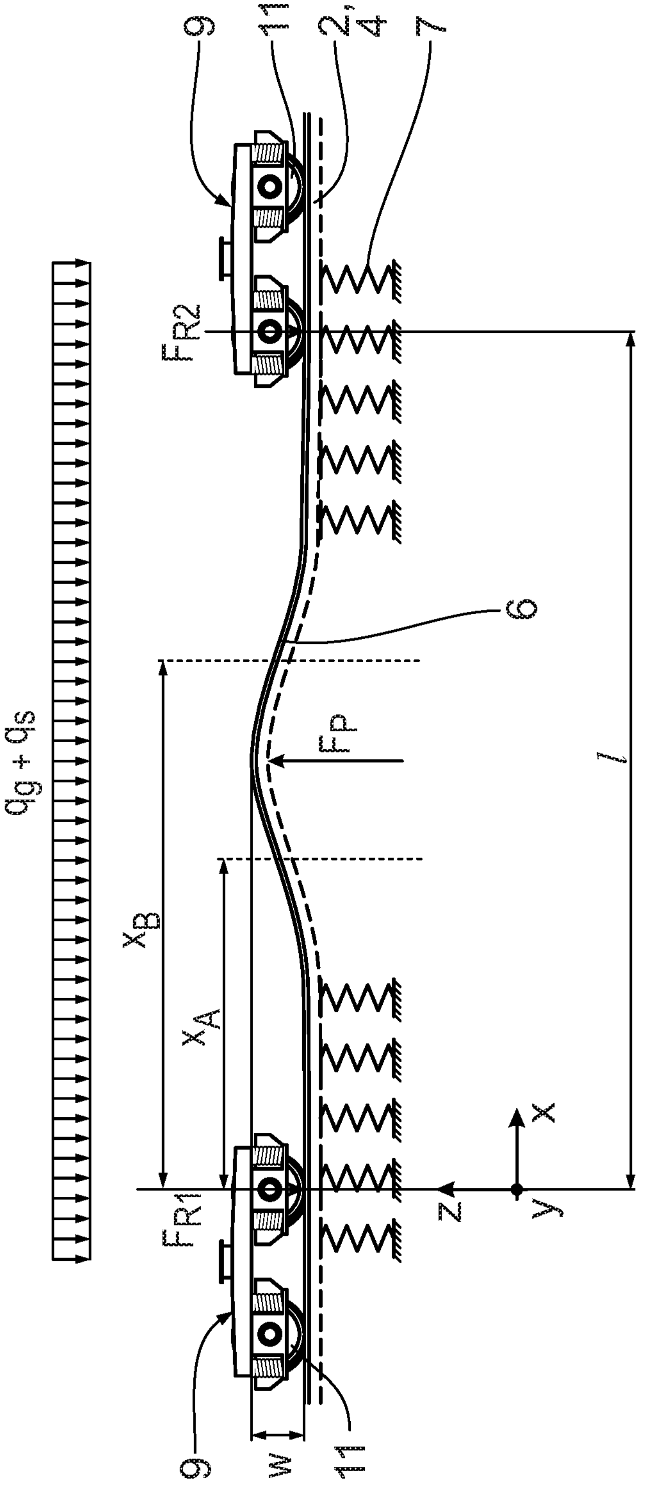
Figure 4:
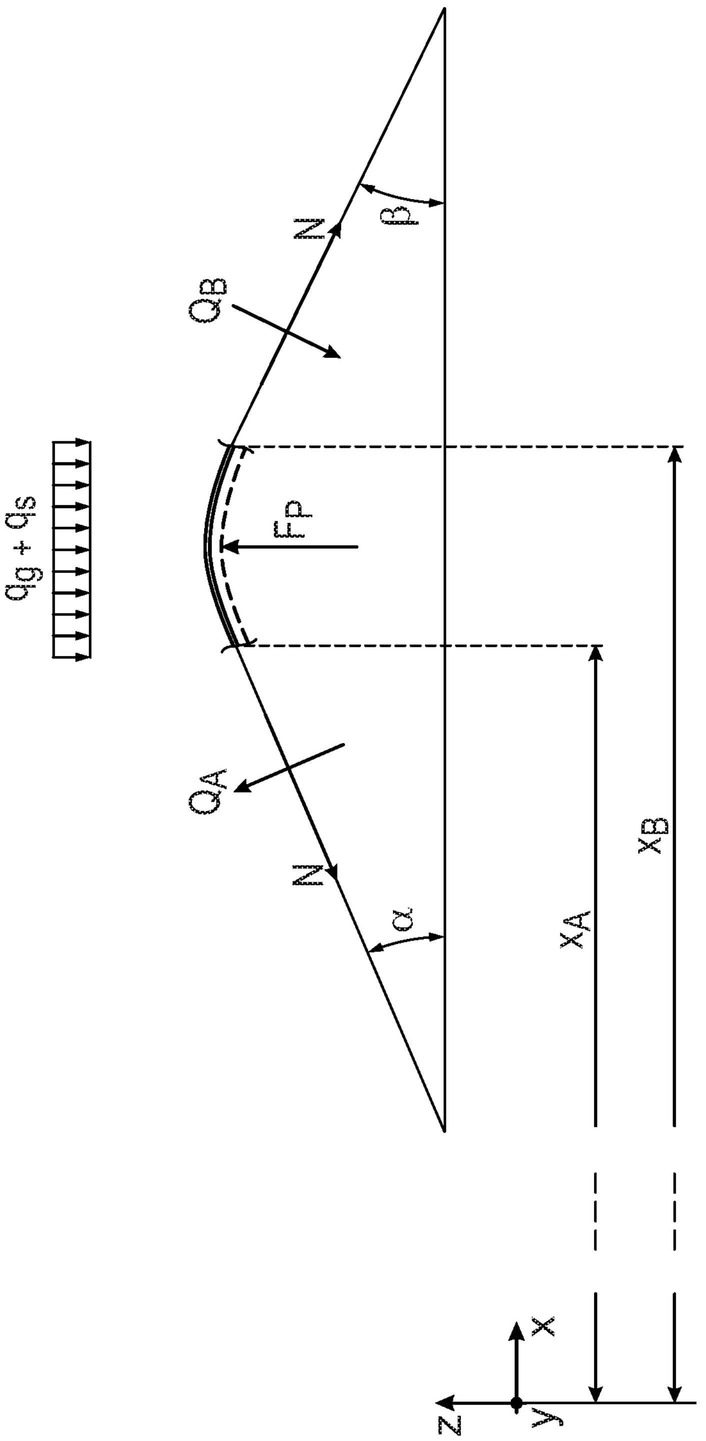

With reference to FIGS. 1 to 4, an embodiment of a device 1 for determining the longitudinal forces in track rails 2 is described. The device 1 has a running trailer 3 for travelling on a track 4 and a test device 5 for shifting a rail section 6 of the at least one track rail 2 and for recording at least one force measurement value.

The track 4 is arranged on a track bed 7, in particular a ballast bed. Two track rails 2 that are arranged parallel and spaced apart from each other are attached to sleepers 8. The sleepers 8 rest on the track bed 7. The track 4 is in a negotiable assembly state.

The running trailer 3 is arranged on the track rails 2 for travelling on the track 4. The running trailer 3 comprises two bogies 9 and a support frame 10 attached to it. The bogies 9 have rail-guidable wheels 11. At least one traction motor 12 of the running trailer 3 provides the drive power required to shift it along the track 4.

The test device 5 comprises a lifting and lining unit 13. The lifting and lining unit 13 has a grapple 14 for reversible gripping the track rail 2. One lifting actuator 15 per track rail 2 is provided for shifting the rail section 6 along a vertical direction z. A lining actuator, not shown, is designed to shift the at least one track rail 2 in a horizontal direction y orientated perpendicular to a longitudinal direction x of the track 4. The respective lifting actuator 15 and the respective lining actuator are designed as fluidic, in particular hydraulic, actuators. The lifting actuator 15 and/or the lining actuator are preferably designed to effect a test force $F_P$, in particular via the grapple 14, on the respective track rail 2.

The lifting and lining unit 13 has a force measuring means 16 which is designed to record a force measurement value which correlates with the test force $F_P$ for shifting the at least one rail section 6 between an initial arrangement and a test arrangement. The force measuring means 16 is preferably designed as a load cell. The lifting and lining unit 13 also has a distance measuring means for each lifting actuator 15 and each lining actuator for recording a distance measurement value w, which correlates with a vertical and/or horizontal deflection of the at least one track rail 2, in particular the rail section 6, in particular in the area of the grapple 14, between the initial arrangement and the test arrangement. The respective distance measuring means 17 preferably has at least one regulating distance sensor, in particular a potentiometer, for detecting a regulating distance of the respective lifting actuator 15 and/or the respective lining actuator.

The lifting and lining unit 13 is attached to the support frame 10. A supply device 18 of the device 1 provides the electrical and fluidic power required to operate the device 1, in particular the hydraulic power required to operate the respective lifting actuator 15 and the lining actuator.

The device 1 has a tamping unit 19 for compacting the track bed 7 on which the track 4 is based. The tamping unit 19 is attached to a tamping segment frame 21 via a vertically orientated linear bearing 20. The tamping segment frame 21 is attached to the support frame 10. A vertical drive 22 is designed to shift the tamping unit 19 along the linear bearing 20.

The tamping unit 19 comprises two tamping tines 23 and a tamping drive 24. The tamping drive 24 is designed to swivel the tamping tines 23 around horizontal tamping tine axes 25. A combined swivelling and vibrational movement around the respective tamping tine axis 25 is transmitted to the tamping tines 23 by means of the tamping drive 24.

The tamping drive 24 comprises electrical and/or fluidic, in particular hydraulic actuators. The tamping drive 24 is connected to the supply device 18 in a power-transmitting manner. The tamping unit 19 is supplied with the required electrical and/or fluidic power by means of the supply device 18.

The device 1 has a control device 26. The control device 26 is in signalling connection with the lifting and lining unit 13 and the tamping unit 19, in particular also with the running trailer 3 and the supply device 18. The control device 26 is designed to control the arrangement of the track 4, in particular the at least one track rail 2, by means of the lifting and lining unit 13. Furthermore, the control device 26 is designed to control the compaction of the track bed 7 by means of the tamping unit 19. In particular, the control device 26 is designed to control the supply device 18 and/or the travelling movement of the running trailer 3 along the track 4.

The tamping unit 19 has a reaction force measuring means, not shown, for recording a reaction force measurement value which correlates with a ballast force acting between the track bed 7 and the tamping tines 23. The reaction force measuring means can, for example, be designed as a pressure sensor for recording the hydraulic pressure in a hydraulic actuator of the tamping drive 24. Preferably, the reaction force measuring means is designed to record a reaction force measurement value which acts between the at least one tamping tine 23 and the track bed 7 when the at least one tamping tine 23 penetrates the track bed 7, in particular in the vertical direction, and/or during a cyclic movement, in particular a vibrational movement, of the at least one tamping tine 23. The reaction force measurement value can correlate accordingly with the penetration force acting on the at least one tamping tine 23 and/or a vibration force acting on the at least one tamping tine 23 during compaction.

Furthermore, the device 1 comprises a temperature measuring means 27 for determining the temperature of the at least one track rail 2. The temperature measuring means 27 is designed as a pyrometer. It is in signalling connection with the control device 26.

An evaluation device 28 of the device 1 is designed to determine the longitudinal forces in the at least one track rail 2 on the basis of a signal from the force measuring means 16, in particular also on the basis of signals from the respective distance measuring means 17, the reaction force measuring means, and/or the temperature measuring means 27.

The mode of operation of the device 1 for determining the longitudinal forces in track rails 2 is as follows:

FIG. 1 shows the device 1, in a first working position. In the first working position, the device 1 is positioned on the track 4. The tamping tines 23 of the tamping unit 19 are not engaged with the track bed 7. The two rail sections 6, arranged in pairs, overlap the lifting and lining unit 13, the two grapples 14, and the tamping unit 19 along the longitudinal direction x. The lifting and lining unit 13 is positively connected to the rail sections 6 via the two grapples 14. In the first working position, the lifting and lining unit 13 does not exert any force on the track 4, in particular the rail sections 6 of the track rails 2. The two track rails 2, in particular the rail sections 6, are located in the initial arrangement.

To determine the longitudinal forces in the two track rails 2, the control device 26 provides a signal to activate the two lifting actuators 15 on the supply device 18. The lifting actuators 15 provide the test force $F_P$ and move the two grapples 14 with the rail sections 6 upwards in the vertical direction z. The device 1 is in the second working position shown in FIG. 2. The two track rails 2, in particular the rail sections 6, are located in the test arrangement.

The vertical deflection w is determined by the distance of the respective rail section 6 between the initial arrangement and the test arrangement at the point where the test force $F_P$ is applied, i.e. at the respective grapple 14. The respective distance measuring means 17 of the lifting and lining unit 13 records the distance measurement value correlating with the regulating distance of the associated lifting actuator 15 and correspondingly with the vertical deflection w. The force measuring means 16 is used to record a force measurement value that correlates with the test force $F_P$ acting on the respective track rail 2 via the respective grapple 14.

The track rails 2 are attached to the sleepers 8 in the test arrangement, in particular when recording the at least one force measurement value. In the test arrangement, the track 4, in particular in the area of the at least one rail section 6, is in a negotiable assembly state.

The temperature measuring means 27 records, in particular without contact, a temperature measurement value that correlates with the temperature of the respective track rail 2.

The control device 26 provides a signal to start compacting the track bed 7. The tamping unit 19 is lowered by means of the vertical drive 22. The tamping tines 23 penetrate the track bed 7. The tamping tines 23 are swivelled around the respective tamping tine axis 25 and subjected to a vibrational movement. The ballast of the track bed 7 is compacted in the area below the tamping unit 19. A reaction force measurement value is recorded during compaction of the track bed 7 using the reaction force measuring means. The compaction process is ended and the tamping unit 19 is shifted back into the first working position.

The longitudinal forces, in particular a normal force N, in the track rails 2 are determined using the recorded force measurement values, distance measurement values, temperature measurement values, and reaction force measurement values. Information regarding the weight-based line load based on the linear weight $q_g$ of the track rails 2 is stored in the evaluation device 28. Furthermore, the evaluation device 28 comprises information about the resulting linear weight $q_s$ of the sleepers 8 along the longitudinal direction x. This linear weight $q_s$ of the sleepers 8 corresponds to the quotient of the average weight of the individual sleeper 8, in particular within the rail section 6, and the average distance $l_s$ between the central longitudinal axes of two adjacent sleepers 8. Also stored in the evaluation device 28 is information relating to the modulus of elasticity E, the cross-sectional area A and the coefficient of thermal expansion $\alpha_T$ of the track rails 2 and the surface moment of inertia I of the track rails 2 about the horizontal transverse axis y and/or about the vertical axis z. The longitudinal forces in the at least one track rail 2 are preferably determined on the basis of the surface moment of inertia I of the track rail 2 about the horizontal transverse axis y when the rail section 6 is shifted in the vertical direction z and/or on the basis of the surface moment of inertia I of the track rail 2 about the vertical axis z when the rail section 6 is shifted in the horizontal direction y.

A bedding modulus k of the track bed 7 is stored in the evaluation device 28. The bedding modulus k corresponds to the stiffness of the track bed 7 in the vertical direction z. The bedding modulus k is determined, in particular adjusted, using the reaction force measurement value.

The longitudinal forces, in particular the normal forces N, the normal stress $\sigma_N$ and/or the longitudinal strain $\varepsilon_N$, in the track rails 2 are calculated using the information described above. According to a first embodiment, the calculation is performed exclusively on the basis of an FEM model stored in the evaluation device 28.

Furthermore, a neutral temperature $T_N$ of the respective track rail 2 is determined. The neutral temperature $T_N$ is the temperature at which the longitudinal forces, in particular normal forces N, in the track rails 2 become zero. For this purpose, the test temperature $T_P$ of the track rails 2 is determined using the temperature measurement value that is present when the at least one force measurement value is recorded. The neutral temperature $T_N$ of the respective rail section 6 is determined from this as follows:

$$T_N = T_P + \frac{N}{EA\alpha_T}$$

To determine the test temperature $T_P$, the temperature measurement value is preferably recorded multiple times during the passage over the respective rail section 6 by means of the temperature measuring means 27. An average value can be determined from the multiple measurement values, which enables particularly precise determination of the test temperature $T_P$. Local temperature fluctuations and measurement deviations can be compensated for by averaging.

According to an alternative embodiment, the longitudinal forces, in particular the normal force N, the normal stress $\sigma_N$ and the longitudinal strain $\varepsilon_N$, in the respective track rail 2 can be determined using analytical methods. The respective track rail 2 is modelled as an elastically embedded beam on the basis of Bernoulli's linear beam theory. The track bed 7 is modelled based on the previously known Winkler bedding modulus method. The boundary value problem for the vertical deflection w along the longitudinal direction x can be described as follows:

$$EIw''''(x) + k\gamma(w(x))w(x) = q_g + q_s.$$

The support points of the wheels 11 closest to the lifting and lining unit 13 are assumed to be locating bearings with respect to the longitudinal direction x, from which follows $$w'(x=0) = w'(x=l) = 0,$$

$$-EIw'''(x=0) = F_{R1}, \text{ and}$$

$$-EIw'''(x=l) = F_{R2}.$$

$F_{R1}$ and $F_{R2}$ are the vertical transverse forces acting on the wheels 11 on the track rails 2. $\gamma$ is an indicator function for the loss of bedding due to the test force $F_P$, which is determined according to $$\gamma(w(x)) = \frac{1}{2}[\tan h(\lambda w(x)) + 1].$$

The ballast parameter $\lambda$ describes the transition between the area of the rail section 6 resting on the track bed 7 and the area of the rail section 6 that is out of contact with the track bed 7. Preferably, the bedding parameter $\lambda$ is assumed to be significantly greater than the maximum value of the vertical deflection w. To determine the vertical deflection w(x), the above differential equation can be solved numerically. Based on this, the positions $x_A$ and $x_B$ are determined in which the transverse forces $Q_A=Q\ (x=x_A)$, $Q_B=Q\ (x=x_B)$ are equal to zero. In these positions, the track rail angles $\alpha$, $\beta$ corresponding to the gradient of the track rails 2 are determined as follows:

$$\alpha \approx \tan\alpha = w'(x_A), \text{ and}$$

$$\beta \approx \tan\beta = w'(x_B).$$

The equilibrium of forces in the vertical direction provides the normal force N to be determined according to $$N = \frac{F_P - (x_B - x_A) * (q_s + q_g)}{\sin\alpha + \sin\beta}.$$

Alternatively, the track rail angles $\alpha$, $\beta$ can be determined approximately as the quotient of the vertical deflection w and an empirically determined length value, which correlates with the distance between the positions $x_A$, $x_B$. Using the normal force N, the normal stress $\sigma_N$ can be determined as follows:

$$\sigma_N = \frac{N}{A}.$$

The longitudinal strain $\varepsilon_N$ can be calculated as follows according to $$\varepsilon_N = \frac{N}{EA}.$$

Preferably, the at least one force measurement value correlating with the test force $F_P$ is recorded at at least two different vertical deflections w. In particular, a progression of the at least one force measurement value over the vertical deflection w can be determined. This allows the longitudinal forces in the respective track rail 2 to be determined multiple times, in particular during the shifting of the rail section 6 between the initial arrangement and the test arrangement. By averaging these multiple longitudinal forces, an increase in accuracy can be achieved. Furthermore, the weight of the respective track rail 2 and/or the sleepers 8 can be deduced from this. The longitudinal forces in the track rails 2 can therefore be determined particularly reliably and precisely.

Preferably, a computer program product is provided for carrying out the method described above. The computer program product can be stored on a memory unit, in particular the evaluation device 28.

The fact that the method can be carried out while the track 4 is in a negotiable assembly state means that the longitudinal forces in track rails 2 can be determined in a particularly time-efficient and economical manner. The at least one sleeper 8 attached to the rail section 6 is included in the determination of the longitudinal forces, as described above, in particular by taking into account its weight and the track bed 7 acting on it. Removing the connection between the track rails 2 and the sleepers 8 to determine the longitudinal forces can be avoided. Non-destructive testing of track 4 is possible. In particular, the method can be carried out independently of the difference between the neutral temperature $T_N$ and the test temperature $T_P$. In particular, the test temperature $T_P$ for carrying out the method can be greater than the neutral temperature $T_N$ because there is no risk of shifting the track rails 2 relative to the sleepers 8.

The fact that the method is carried out by means of the device 1, in particular by means of a track construction and maintenance machine, means that the longitudinal forces can be determined in a particularly economical manner. A corresponding device 1 has a particularly wide range of applications. The compaction of the track bed 7 and the determination of the longitudinal forces can be carried out at least partially in parallel by means of the device 1 and thus be particularly time-efficient.

The invention claimed is:

1. A method for determining longitudinal forces in track rails, the method comprising:

shifting a rail section of at least one of the track rails of a track from an initial arrangement into a test arrangement by providing a test force, the rail section overlapping, along a longitudinal direction of the track, at least a location where the test force is provided on the at least one track rail;

shifting at least one sleeper attached to the rail section together with the rail section by providing the test force, from the initial arrangement into the test arrangement;

limiting the rail section along the longitudinal direction by sections of the at least one track rail not undergoing any shifting in the test arrangement compared to the initial arrangement;

recording at least one force measurement value correlating with the test force in the test arrangement, with the at least one sleeper being attached to the rail section when recording the at least one force measurement value; and determining the longitudinal forces in the at least one track rail by using the at least one force measurement value.

2. The method according to claim 1, which further comprises keeping the rail section in a negotiable assembly state when the at least one force measurement value is recorded.

3. The method according to claim 1, which further comprises determining a neutral temperature of the at least one track rail based on the longitudinal forces.

4. The method according to claim 1, which further comprises recording at least one distance measurement value correlating with a deflection of the at least one track rail between the initial arrangement and the test arrangement.

5. The method according to claim 1, which further comprises using a lifting and lining unit of a track construction and maintenance machine to carry out the shifting.

6. The method according to claim 1, which further comprises compacting a track bed on which the rail section is based.

7. The method according to claim 1, which further comprises determining the longitudinal forces by taking into account a bedding stiffness of a track bed on which the rail section is based.

8. The method according to claim 7, which further comprises determining the bedding stiffness at least one of based on at least one compaction measurement value recorded during compaction of the track bed or based on the at least one force measurement value correlating with the test force.

9. The method according to claim 1, which further comprises determining the longitudinal forces by analytical methods.

10. The method according to claim 1, which further comprises determining the longitudinal forces by the finite element method.

11. The method according to claim 1, which further comprises determining the longitudinal forces based on at least two of the force measurement values, correlating with test forces in respectively different test arrangements.

12. A device for determining longitudinal forces in track rails, the device comprising:

a test device for shifting the rail section and for recording the at least one force measurement value to carry out the method according to claim 1.

13. The device according to claim 12, which further comprises a running trailer for travelling on a track, the test device being attached to the running trailer.

14. The device according to claim 13, wherein the test device is configured to shift the rail section of the track rail carrying the running trailer.

15. The device according to claim 12, which further comprises a tamping unit for compacting a track bed on which the rail section is based.

* * * * *